United States Patent
Heberer et al.

(10) Patent No.: US 11,035,586 B2
(45) Date of Patent: Jun. 15, 2021

(54) ENERGY RECOVERY VENTILATOR

(71) Applicant: CARRIER CORPORATION, Farmington, CT (US)

(72) Inventors: Dwight H. Heberer, Brownsburg, IN (US); Daniel J. Dempsey, Carmel, IN (US); Eric W. Adams, Manlius, NY (US); Kenton J. Kuffner, Indianapolis, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 905 days.

(21) Appl. No.: 14/376,005

(22) PCT Filed: Jan. 29, 2013

(86) PCT No.: PCT/US2013/023589
§ 371 (c)(1),
(2) Date: Jul. 31, 2014

(87) PCT Pub. No.: WO2013/116197
PCT Pub. Date: Aug. 8, 2013

(65) Prior Publication Data
US 2014/0374065 A1    Dec. 25, 2014

Related U.S. Application Data

(60) Provisional application No. 61/594,060, filed on Feb. 2, 2012.

(51) Int. Cl.
*F24F 12/00* (2006.01)
*F24F 1/0007* (2019.01)
*F24F 11/00* (2018.01)

(52) U.S. Cl.
CPC .......... *F24F 12/001* (2013.01); *F24F 1/0007* (2013.01); *F24F 12/006* (2013.01);
(Continued)

(58) Field of Classification Search
CPC ... F24F 12/006; F24F 12/001; F24F 2012/007
See application file for complete search history.

(56) References Cited

U.S. PATENT DOCUMENTS

| 2,189,895 A | 2/1940 | Grutzner |
| 3,774,374 A | 11/1973 | Dufour et al. |

(Continued)

FOREIGN PATENT DOCUMENTS

| CA | 2558628 A1 | 11/2008 |
| DE | 19937137 A1 | 2/2001 |

(Continued)

OTHER PUBLICATIONS

Notification of Transmittal of the International Search Report and the Written Opinion of the International Searching Authority, or the Declaration; PCT/US2013/023589; dated Apr. 24, 2013; 14 pages.

(Continued)

*Primary Examiner* — Devon Russell
(74) *Attorney, Agent, or Firm* — Cantor Colburn LLP

(57) ABSTRACT

An energy recovery system includes a heating and cooling system having a controller and a furnace or fan coil in fluid communication with each of a return air duct and a supply air duct; and an energy recovery ventilator (ERV) having an intake air duct and an exhaust air duct, the ERV being energized by a direct electrical connection to the heating and cooling system. The return air duct is operable to receive stale conditioned air from a conditioned air space while the controller is configured for controlling the ERV to transfer energy from the stale conditioned air to an outside air stream.

14 Claims, 6 Drawing Sheets

(52) U.S. Cl.
CPC ... *F24F 2011/0002* (2013.01); *F24F 2221/34* (2013.01); *F24F 2221/54* (2013.01); *Y02B 30/56* (2013.01)

(56) References Cited

U.S. PATENT DOCUMENTS

| | | | |
|---|---|---|---|
| 3,855,814 | A | 12/1974 | Eubank |
| 4,079,888 | A | 3/1978 | Briscoe |
| 4,333,520 | A | 6/1982 | Yanadori et al. |
| 4,497,361 | A | 2/1985 | Hajicek |
| 4,550,773 | A | 11/1985 | Martin |
| 4,562,955 | A | 1/1986 | Horster et al. |
| 4,751,910 | A | 1/1988 | Allen et al. |
| 4,741,391 | A | 5/1988 | Schmitz |
| 4,834,285 | A | 5/1989 | Besik |
| 4,952,283 | A | 8/1990 | Besik |
| 5,179,998 | A | 1/1993 | Des Champs |
| 5,183,098 | A | 2/1993 | Chagnot |
| 5,490,557 | A | 2/1996 | Taylor |
| 5,597,354 | A | 1/1997 | Janu et al. |
| 5,632,334 | A * | 5/1997 | Grinbergs ............ F24F 12/006 165/232 |
| 5,855,320 | A | 1/1999 | Grinbergs |
| 5,887,784 | A | 3/1999 | Haas |
| 6,209,622 | B1 | 4/2001 | Lagace et al. |
| 6,328,095 | B1 | 12/2001 | Felber et al. |
| 6,347,527 | B1 | 2/2002 | Bailey et al. |
| 6,385,983 | B1 | 5/2002 | Sakki et al. |
| 6,575,228 | B1 | 6/2003 | Ragland et al. |
| 6,619,063 | B1 | 9/2003 | Brumett |
| 6,698,219 | B2 | 3/2004 | Sekhar et al. |
| 6,889,750 | B2 | 5/2005 | Lagace et al. |
| 7,017,827 | B2 | 3/2006 | Shah et al. |
| 7,073,566 | B2 | 7/2006 | Lagace et al. |
| 7,165,414 | B2 | 1/2007 | Wright |
| 7,231,967 | B2 | 6/2007 | Haglid |
| 7,251,953 | B2 | 8/2007 | Wetzel et al. |
| 7,353,843 | B2 | 4/2008 | Arrowood, Jr. et al. |
| 7,563,160 | B2 | 7/2009 | Kim et al. |
| 7,766,734 | B2 | 8/2010 | Dietz et al. |
| 7,802,443 | B2 | 9/2010 | Wetzel |
| 7,891,573 | B2 | 2/2011 | Finkam et al. |
| 7,942,193 | B2 | 5/2011 | Caldwell |
| 7,987,680 | B2 | 8/2011 | Hamada et al. |
| 7,997,328 | B2 | 8/2011 | Kim et al. |
| 8,453,790 | B1 * | 6/2013 | Oliver ................ F24F 1/0007 181/224 |
| 2003/0013407 | A1 | 1/2003 | Gagnon et al. |
| 2005/0269057 | A1 | 12/2005 | Lee et al. |
| 2006/0117769 | A1 | 6/2006 | Helt et al. |
| 2006/0151165 | A1 | 7/2006 | Poirier |
| 2007/0045436 | A1 | 3/2007 | Wolfson |
| 2007/0084586 | A1 | 4/2007 | Poirier |
| 2007/0095519 | A1 | 5/2007 | Hombucher |
| 2007/0158049 | A1 | 7/2007 | Kim et al. |
| 2007/0169927 | A1 | 7/2007 | Isaka et al. |
| 2008/0113609 | A1 | 5/2008 | Ehlers et al. |
| 2009/0001179 | A1 | 1/2009 | Dempsey |
| 2009/0019875 | A1 | 1/2009 | Fink et al. |
| 2009/0126382 | A1 | 5/2009 | Rubino et al. |
| 2009/0139261 | A1 | 6/2009 | Nakano et al. |
| 2009/0170420 | A1 | 7/2009 | Dubensky et al. |
| 2009/0253365 | A1 | 10/2009 | Gagnon et al. |
| 2010/0084483 | A1 | 4/2010 | Pieper |
| 2010/0291857 | A1 | 11/2010 | Cho et al. |
| 2011/0036541 | A1 | 2/2011 | Takada et al. |
| 2011/0146941 | A1 | 6/2011 | Benoit et al. |
| 2011/0159795 | A1 | 6/2011 | Sprague et al. |
| 2011/0173999 | A1 | 7/2011 | Lord et al. |
| 2011/0189937 | A1 | 8/2011 | Hasegawa et al. |
| 2011/0217917 | A1 | 9/2011 | Sulva |
| 2011/0232860 | A1 | 9/2011 | Lackie et al. |

FOREIGN PATENT DOCUMENTS

| | | | |
|---|---|---|---|
| DE | 102007016345 A1 * | 10/2008 | ............ F24F 1/022 |
| DE | 102007016345 A1 | 10/2008 | |
| EP | 0029573 A2 * | 6/1981 | ............ F24F 3/147 |
| EP | 1376023 A1 | 1/2004 | |
| EP | 2116786 A1 | 11/2009 | |
| GB | 2332048 A | 6/1999 | |
| GB | 2470528 A | 11/2010 | |
| JP | S57115637 A | 7/1982 | |
| JP | S63210544 A | 9/1988 | |
| JP | H0261446 A | 3/1990 | |
| JP | H02272243 A | 11/1990 | |
| JP | H03263537 A | 11/1991 | |
| JP | H04273936 A | 9/1992 | |
| JP | H05157299 A | 6/1993 | |
| JP | H05256485 A | 10/1993 | |
| JP | H07260228 A | 10/1995 | |
| JP | H07293961 A | 11/1995 | |
| JP | 7-332727 | 12/1995 | |
| JP | H0861733 A | 3/1996 | |
| JP | H09100800 A | 4/1997 | |
| JP | H11351649 A | 12/1999 | |
| JP | 2000146249 A | 5/2000 | |
| JP | 2000146250 A | 5/2000 | |
| JP | 2000266480 A | 9/2000 | |
| JP | 2000274763 A | 10/2000 | |
| JP | 2001012795 A | 1/2001 | |
| JP | 2003083582 A | 3/2003 | |
| JP | 2005344985 A | 12/2005 | |
| WO | 9518338 A1 | 7/1995 | |
| WO | 2008127660 A1 | 4/2008 | |
| WO | 2010002957 A2 | 1/2010 | |

OTHER PUBLICATIONS

International Preliminary Report on Patentability for application PCT/US2013/023589, dated Aug. 5, 2014, 7 pages.
Aria Brands, Inc. , "Manuel de dimensionnement, d'installation et d'utilisation", Lifebreath, Jul. 2007, 48pgs.
Aria Brands, Inc., "Intergrated Vertical Stack, Occupant controlled, energy efficient ventilation with heat recovery", Ventmax, Jul. 2010, 2 pages.
Canada Mortgage and Housing Corporation, "Field Testing of an Integrated Ventilation Space Conditioning System for Apartments" Research Highlights, Jan. 2004, 6pgs.
Canada Mortgage and Housing Corporation, "Innovative Buildings: Multi-Residential Natural Resource Conservation Energy and Efficiency", CMHC SCHL, 2006, 6pgs.
Eakes, Jon, "HRV—both supply and exhaust ducted to furnace. Is this a good idea?", Dec. 21, 2011, 2pgs.
Le Minilim De Technoclim Inc., "Un Minisysteme Central De Climatisation Efficace, Compact Et Abordable", Nov.-Dec. 2010, 1 pg.
Nu-Air, "Enerboss EN400, EN500, EN700, EN900 series", 2008, 2 pgs.
NY Thermal Inc., "The Matrix Total Home System", BioGas Energy, Oct. 2008, 4pgs.
Parent, Michel et al., "Modelling of an Advanced Integrated Mechanical System for Residential Applications", Rio de Janeiro, Brazil, Aug. 13-15, 2001, 8pgs.
RenewAire, "Installation and Operation Manual Model BR70/BR130", 2008 RenewAire LLC, 8 pgs.
Unilux V.F.C. Corp., "Unilux VFC Integrated with HRV", 17 pgs.
Unilux V.F.C., "Unilux Fan Coil Capacity Schedule", DLE1000-ERV75, 1 pg.
Unilux V.F.C., "Unilux Fan Coil Capacity Schedule", DLE1000-HRV75, 1 pg.
Vemar, "Energy Efficient Fresh Air System", Product Sheet No. 91433B, Sep. 2009, 1 pg.
Venmar Ventilation Inc., "Enerflo brochure" 4 pages.
Venmar Ventilation Inc., "Enerflo Installation Instructions, Energy Efficient Fresh Air System", 07959 rev. G, 18pgs.
Venmar Ventilation Inc., "Installation and User Manual Furnace Air Exchanger With Heat Recovery Models" VB0134, 14 pgs.

(56) References Cited

OTHER PUBLICATIONS

Venmar Ventilation Inc., "Installation and User Manual Furnace Air Exchanger with Heat Recovery VB0026", May 15, 2002, 14 pages.

\* cited by examiner

ENERGY RECOVERY VENTILATOR

FIELD OF INVENTION

This invention relates generally to heating exchangers and, more particularly, to an energy recovery ventilator ("ERV") that attaches directly to an existing furnace, fan coil or air handler and uses two duct connections for recovering energy from indoor air.

DESCRIPTION OF RELATED ART

An ERV is generally used with a heating or cooling system to exhaust stale air from a stale air space to a fresh air space and bring in fresh air from the fresh air space to the stale air space while exchanging heat or cool energy, thereby reducing heating or cooling requirements. Typically, an ERV includes a heat exchanger contained in a housing for exchanging heat or cool energy. When the ERV is used with a heating or cooling system, an outside air stream from the outdoors and a stale room air stream from the return air duct separately enter the ERV and pass through the heat exchanger. Within the heat exchanger, energy from the stale room air stream is transferred either to or from the outside air stream. The outside air stream then exits the ERV to the return air duct as a fresh air stream. The stale room air stream then exits the ERV to the outdoors as an exhaust room air stream.

Residential ERVs are mounted on a wall or ceiling and generally require four duct pipes to exchange cool or heat energy with an air handler system. In an example, the outside air stream and the stale room air stream enter the housing through duct pipes connected to two air flow openings in the housing. The fresh air stream and the exhaust room air stream exit the housing through two other duct pipes connected to two other air flow openings in the housing. These ERVs are standalone heat exchangers that are remotely mounted from the heating or cooling system and are not designed to be connected directly to a furnace or an air handler in a heating or cooling system. As connected to the heating or cooling system, this ERV is costly and cumbersome to install as it requires the installation of four separate duct pipes to carry each air stream to or from the fresh air or stale air spaces. Moreover, these ERVs require low voltage wall controls with an available power receptacle, which further complicates the installation process.

BRIEF SUMMARY

According to one aspect of the invention, an energy recovery system includes a heating and cooling system including a controller and a furnace or fan coil in fluid communication with each of a return air duct and a supply air duct; an energy recovery ventilator ("ERV") including an intake air duct and an exhaust air duct, the ERV being energized by a direct electrical connection to the heating and cooling system. The return air duct is operable to receive stale conditioned air from a conditioned air space while the controller is configured for controlling the ERV to transfer energy from the stale conditioned air to an outside air stream.

According to another aspect of the invention, a method of recovering energy with a heating and cooling system including an ERV coupled to a furnace or fan coil; receiving stale conditioned air from a conditioned air space; energizing the ERV via a direct electrical connection to the heating and cooling system; controlling a transfer of recovered energy from the stale conditioned air to an outside air stream; and communicating the outside air stream to the furnace or fan coil as a fresh air stream. Also, the heating and cooling system comprises a return air duct, a supply air duct, and a controller.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the FIGURES.

DETAILED DESCRIPTION

An embodiment of an energy recovery ventilator ("ERV") for use with a heating or cooling system includes a generally rectangular housing that may be directly attached to an existing furnace/fan coil in the system. The ERV includes a fresh air intake duct and an exhaust air duct. In an embodiment, an outside air stream enters the ERV through the fresh air intake duct while stale conditioned air from an interior conditioned air space is exhausted through the exhaust air duct. The ERV includes a heat exchange device for recovering energy from the stale conditioned air prior to exhausting the stale conditioned air to an outside air space. In an embodiment, the ERV may be used with a wall penetration that provides a simplified duct assembly for connecting the ducts to the outside air space. In an embodiment, the ERV may be electrically wired directly, via a wire line, to a power supply in the heating and cooling system in order to energize the ERV and eliminate providing a standalone power supply. In one non-limiting embodiment, a two-wire line may be used to simplify the electrical connection to the heating or cooling system. But, in other embodiments, any number of wire-lines may be used to electrically connect the ERV to the heating and cooling system. The ERV may also be connected to a furnace/fan coil controller in the heating and cooling system for controlling the operation of the ERV without requiring an additional dedicated controller for ERV control and operation.

Figure 1:
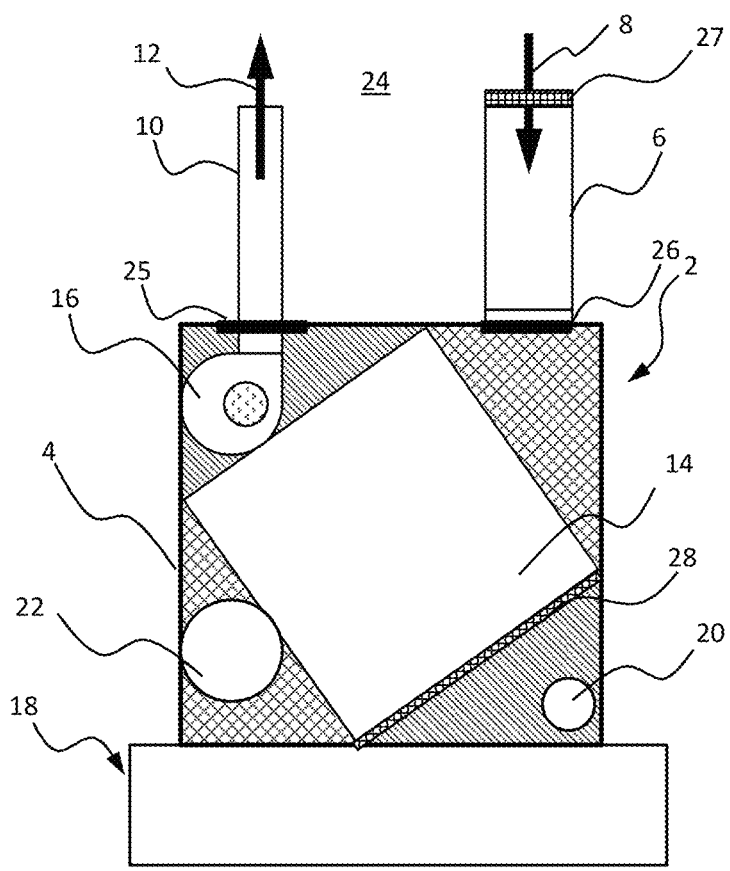
FIG. 1 illustrates an elevation view of an energy recovery ventilator ("ERV") according to an embodiment of the invention.
Figure 2:
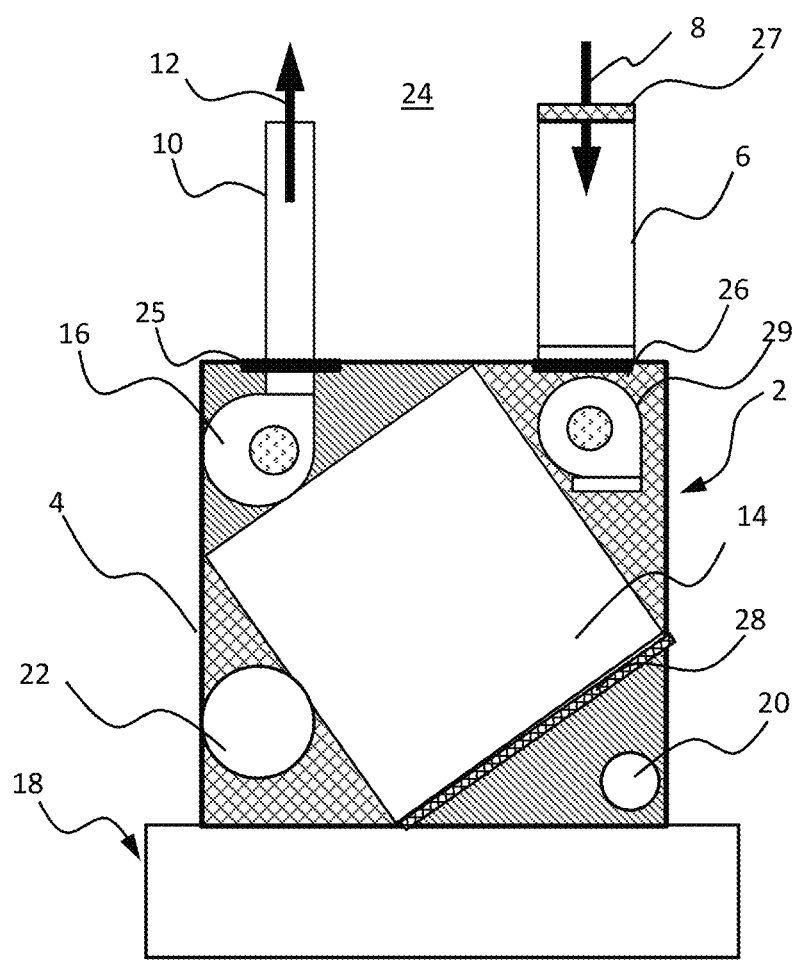
FIG. 2 illustrates an elevation view of an ERV according to another embodiment of the invention.

Referring now to the drawings, FIGS. 1-2 illustrate an ERV 2 used in connection with a heating or cooling system 18 for circulating fresh air from the outdoors while recovering energy from stale conditioned air according to an embodiment of the invention. Particularly, the ERV 2 includes a generally rectangular housing 4 fitted with a fresh air intake duct 6 and an exhaust air duct 10. The fresh air intake duct 6 and exhaust air duct 10 are coupled to selectively movable dampers 25, 26, respectively. The dampers 25, 26 are selectively controllable by a furnace/fan coil controller (not shown) in response to signals such as, for example, signals indicative of temperature or humidity that are received from sensors inside the ERV 2. In some non-limiting examples, the dampers 25, 26 may be a valve or plate that stops or regulates the flow of air entering or exiting ERV 2 through the respective ducts 6, 10. The ERV 2 also includes a heat exchange device 14 such as, in some non-limiting examples, a honeycomb heat exchanger or a brazed-plate heat exchanger for recovering energy from stale conditioned air. The stale conditioned air is received through a return port 20, which is in fluid communication with an air return duct coupled to the heating or cooling system 18. A fan 16 is coupled to the heat exchange device 14 in order to induce air movement through the heat exchange device 14 as well as induce to a positive air pressure in the furnace/fan coil of the heating or cooling system 18. In an embodiment, as shown with reference to FIG. 2, a fan or blower 29 may also be fluidly coupled to the fresh air intake duct to either induce air intake from an outdoor air space 24 or control the air flow rate entering the ERV 2 from the outdoor air space 24.

Referring back to FIGS. 1-2, a filter element 27 is coupled to duct connection 6 in order to filter out any dust, debris, pollutants, or the like from the outside air stream 8. Additionally, in an embodiment, a filter element 28 is coupled to a return port 20 to filter an exhaust air stream 12 that is received from a return air duct that is in fluid communication with an interior conditioned air space. In another embodiment, a filter element, which is substantially similar to filter element 28, may be coupled to supply port 22 near or attached to the face of the heat exchanger 14 in order to filter the outside air stream 8. In operation, an outside air stream 8 from, for example, an outdoor air space 24 enters the ERV 2 through duct 6 while stale conditioned air from an interior conditioned air space is received by ERV 2 and exhausted as an exhaust air stream 12 through the exhaust air duct 10. Dampers 25, 26 control the air flow rate entering or exiting the ERV 2 or, alternatively, Dampers 25, 26 may be closed to bypass the ERV 2. The outside air stream 8 circulates through the heat exchange device 14 where energy exchange takes place within the heat exchange device 14. The extracted energy is transferred to the outside air stream 8 and it enters the heating and cooling system 18 as a fresh air stream through the supply port 22.

In an embodiment, as shown in FIGS. 1-2, the ERV 2 may be electrically wired directly, via a two-wire line, to the heating and cooling system 18 in order to energize ERV 2. The direct wiring eliminates need for providing an additional energizing power supply for energizing electrical components of the ERV 2. Also, the ERV may be selectively and electrically coupled to a controller (not shown) located in, for example, an electronics circuit board of the heating and cooling system 18. The controller (not shown) controls operation of the ERV 2 while also eliminating a need for an additional controller, thereby simplifying the installation as well as reducing the costs associated with installation. In an example, the controller may operate the ERV 2 while the furnace/fan coil air circulation blower is ON in order to provide a desired ventilation rate through the heating and cooling system 18. In another example, the controller may operate the ERV 2 for a portion of each hour based on the desired ventilation rate and the air flow capacity of the ERV 2. In an embodiment, the controller includes a microprocessor preprogrammed with software programs that is stored in nonvolatile memory for executing algorithms to provide the ERV 2 with a variety of operation modes and control sequences as indicated above.

In another embodiment, shown in FIGS. 1-2, the ERV 2 may be directly attached to, for example, an air circulation blower compartment of a furnace/fan coil of the heating and cooling system 18 through bolts, screws, or the like. But, in another non-limiting embodiment, the ERV 2 may be attached to a return air duct of an air handler without departing from the scope of the invention. In an embodiment, the ERV 2 may be electrically connected to a power supply as well as to a controller of the furnace/fan coil, thereby eliminating a need for an additional power receptacle or a dedicated controller, respectively. In an embodiment, the heating and cooling system 18 may include fans (e.g., blowers, air handlers, and the like) to communicate air flow from an interior air space to the ERV 2. Other system components such as dampers, filters, additional fans, refrigeration and/or heating/dehumidification (e.g., economizer heat exchangers, heat rejection heat exchangers, and gas coolers/condensers), heat absorption heat exchangers (evaporator) may also be provided. In operation, outside air stream 8 enters the housing 2 through the duct connection 6 while stale conditioned air from the interior conditioned air space passes through the heat exchange device 14. The heat exchange device 14 extracts energy from the stale conditioned air and exhausts the stale conditioned air as an exhaust air stream 12 from the ERV 2. The outside air stream 8 circulates through the heat exchange device 14 where energy is transferred to the outside air steam 8 within the heat exchange device 14. The outside air stream 8 receives the extracted energy and enters the heating and cooling system 18 as a fresh air stream through the supply port 22. Further, stale conditioned air 12 is extracted from, in one non-limiting example, a return air duct that is directly connected to a conditioned air space. The stale conditioned air 12, driven by fan 16, enters the heat ERV 2 through return port 20, circulates through the heat exchange device 14, and exits the ERV 2 through duct connection 10.

Figure 3:
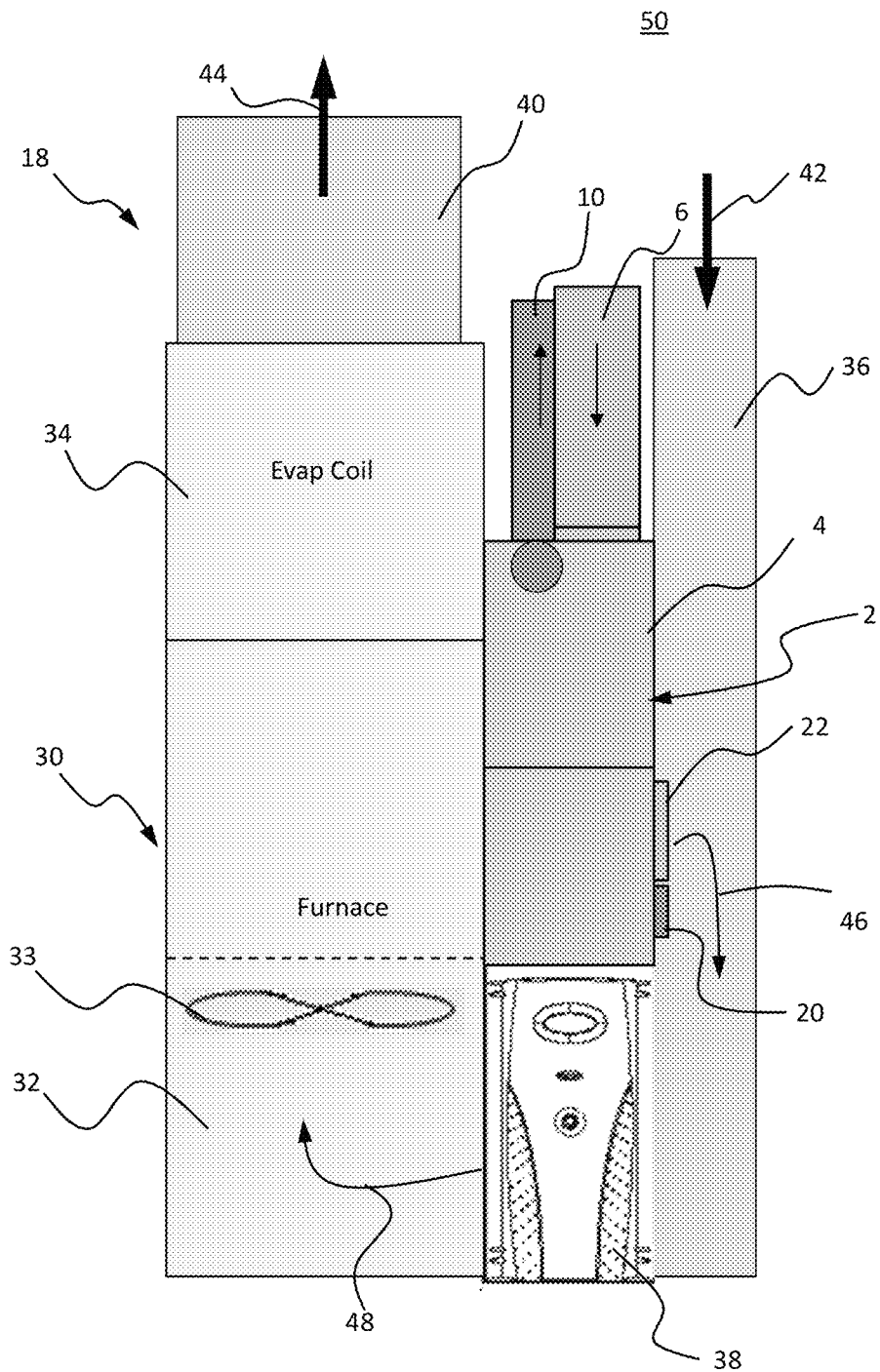
FIG. 3 illustrates an elevation view of an ERV that is connected to a heating and cooling system according to an embodiment of the invention.

FIG. 3 illustrates an elevation view of an ERV 2 that is connected to a heating and cooling system 18 according to an embodiment of the invention. In an embodiment, the ERV 2 is shown as part of a heating and cooling system 18 that may be directly attached to a furnace/fan coil 30, which eliminates additional ducts to couple the ERV 2 to the duct system of the heating and cooling system 18. The ERV 2 is in direct air flow communication with a return air duct 36. Also, the attached ERV 2 directly receives power from a power supply wiring of the heating and cooling system 18 and is controlled by a controller associated with the system 18. In another embodiment, the ERV 2 may be attached onto the system 18 and may be connected to ducts that are directly adjacent to the furnace/fan coil 30. As shown, the ERV 2 may be sized to be located above an air cleaner such as, for example, a high-efficiency air purifier 38 while allowing for convenient access to the air cleaner during filter cleaning or maintenance. The ERV 2 is shown installed in a vertical orientation above the air purifier 38 with the housing being connected to a vertically oriented return air duct 36 and a vertically oriented furnace/fan coil 30. But, in another embodiment, ERV 2 may be installed in a horizontal orientation in order to be coupled to a correspondingly horizontally oriented heating and cooling system 18 without departing from the scope of the invention. The air purifier 38 may be an Infinity Air Purifier manufactured by Carrier® that has a rated airflow of about 1600 or 2000 cubic feet/minute, but other air purifiers may be utilized without departing from the scope of the invention.

Also shown in FIG. 3, the ERV 2 includes a generally rectangular housing 4 that may be directly connected to a furnace/fan coil 30 through bolts, screws, or the like. The ERV 2 includes a fresh air intake duct 6 and an exhaust air duct connection 10. The ERV 2 also includes a return port 20 and a supply port 22. The return port 20 and supply port 22 are in direct communication with the return air duct 36. The stale conditioned air stream 42 from an interior conditioned air space 50 enters the ERV 2 through return port 20 and exits the ERV 2 through duct connection 10 while an outside air stream 8 (shown in FIGS. 1-2) enters the ERV 2 through intake duct 6 and enters the return air duct 36 as a fresh air stream 46 through supply port 22. The energy from the stale conditioned air steam 42 is extracted by the heat exchange device 14 (shown in FIGS. 1-2) inside ERV 2 and transferred to the fresh air stream 46 prior to its supply to the return air duct 36. Further, the fresh air stream 46 mixes with the stale conditioned air stream 42 in the return air duct 36. Also, the air purifier 38 receives the mixed air stream from the return air duct 36 and filters it as a filtered air stream 48 for communication to the furnace/fan coil 30. In another embodiment, an air filter element (not shown) may be provided in lieu of the air purifier 38 in order to filter the stale conditioned air stream 42. The furnace/fan coil 30 includes a circulation air blower compartment 32 having a circulating air blower 33 and an evaporator coil compartment 34 that includes an evaporator (not shown). The circulating air blower 33 recirculates the filtered air stream 48 from the compartment 32 through the evaporator coil compartment 34 and enters the supply duct 40 as conditioned filtered air 44 for conditioning the interior conditioned air space 50. It is to be appreciated that the ERV 2 mounts directly to the furnace/fan coil 30 in order to exhaust stale conditioned air 42 from return air duct 36 while overcoming the negative static pressure in the return air duct 36.

Figure 4:
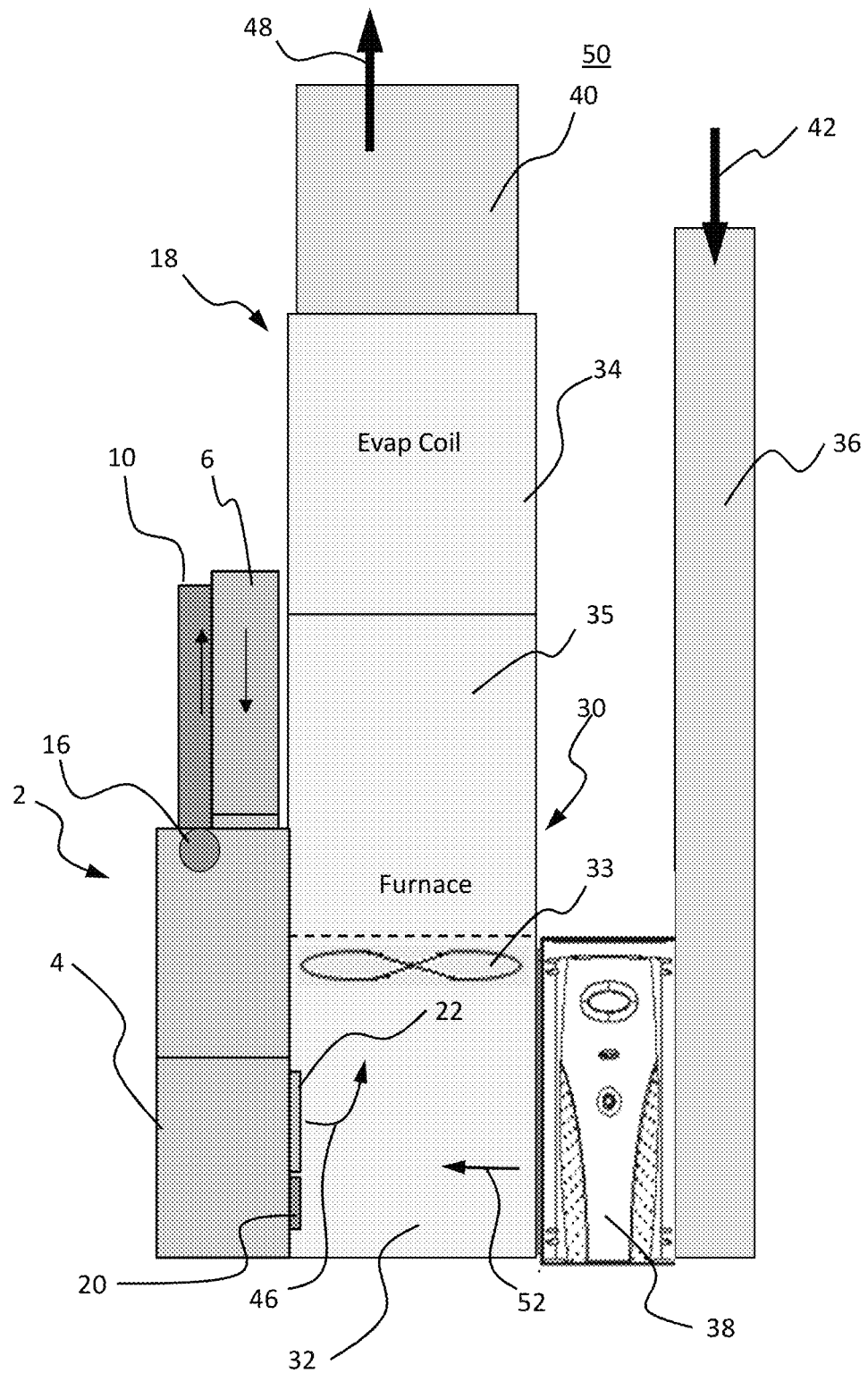
FIG. 4 illustrates an elevation view of the ERV connected to a heating and cooling system in an alternate configuration according to an embodiment of the invention.

FIG. 4 illustrates an elevation view of an ERV 2 that is in direct air flow communication with a furnace/fan coil 30 of system 18 according to another embodiment of the invention. As shown, the ERV 2 is sized to be directly connected to a circulation air blower compartment 32 of furnace/fan coil 30 and receives an air flow from the compartment 32 for energy recovery and recirculation to the interior conditioned air space 50. The ERV 2 includes a fresh air intake duct 6 and an exhaust air duct 10. The ERV 2 also includes a return port 20 and a supply port 22 that are in direct communication with the circulation air blower compartment 32. The ERV 2 is shown installed in a vertical orientation directly coupled to furnace/fan coil 30, which is also vertically oriented. But, in another embodiment, ERV 2 may be installed in a horizontal orientation in order to be coupled to a corresponding horizontally oriented heating and cooling system 18 without departing from the scope of the invention. A stale conditioned air stream 42 from an interior conditioned air space 50 enters system 18 through the return air duct 36. In an embodiment, an air cleaner such as, for example, an air purifier 38 is provided to filter the stale conditioned air stream 42 and communicate a filtered air stream 52 to the negative pressure chamber of circulation air blower compartment 32. In another embodiment, an air filter element (not shown) may be provided in lieu of the air purifier 38 in order to filter the stale conditioned air stream 42. The filtered air stream 52 enters the ERV 2 through return port 20 whereby energy is extracted by the heat exchange device 14 (shown in FIGS. 1-2) prior to exiting the ERV 2 to the outdoor air space via duct 10. This extracted energy is transferred to an outside air stream 8 (shown in FIGS. 1-2) that enters the ERV 2 through intake duct 6. The outside air stream 8 (shown in FIGS. 1-2) is further communicated to the compartment 32 as a fresh air stream 46 through supply port 22. The fresh air stream 46 mixes with the filtered air stream 52 in the compartment 32. The circulation air blower 33 creates a positive pressure in a furnace/fan coil compartment 35. The positive pressure overcomes the negative pressure in the circulation air blower compartment 32 and forces the mixed air from compartment 32 through the evaporator coil compartment 34 for heat-exchange within the evaporator coil compartment 34. The mixed air is forced out of evaporator coil compartment 34 and through the air supply duct 40 as conditioned filtered air 48 in order to condition the interior conditioned air space 50. It is to be appreciated that the ERV 2 mounts directly to the furnace/fan coil 30 in order to exhaust filtered air stream 52 from air blower compartment 32 while overcoming the negative static pressure in the blower air compartment 32.

Figure 5:
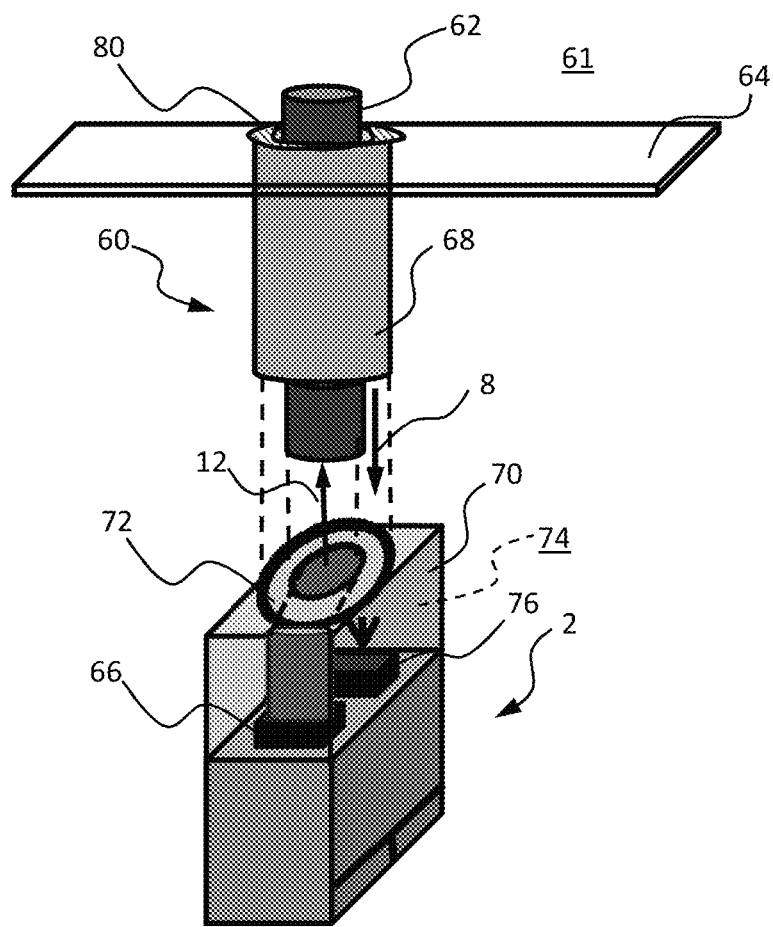
FIG. 5 illustrates an isometric view of an ERV coupled to air duct assembly for enabling a single wall penetration according to an embodiment of the invention.
Figure 6:
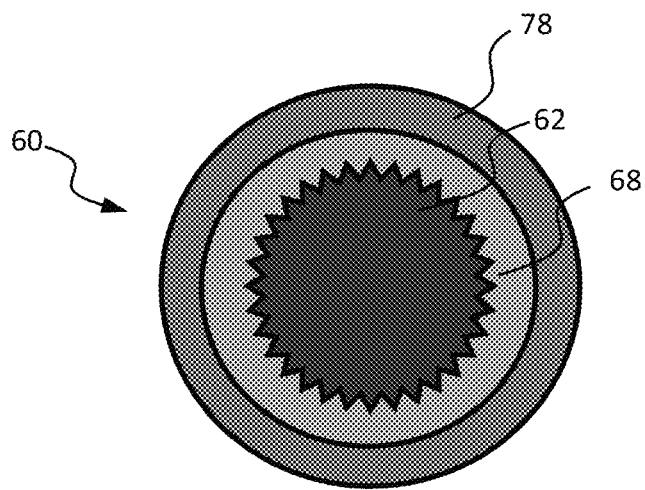
FIG. 6 illustrates a top elevation view of the air duct assembly of FIG. 5 according to an embodiment of the invention.

FIGS. 5-6 illustrate a view of an air duct assembly 60 according to an embodiment of the invention. In a non-limiting example shown in FIGS. 5-6, the air duct assembly 60 may be coupled to ERV 2 for circulating fresh air from an outdoor air space 61 while recovering energy from stale conditioned air. But, in other embodiments, the air duct assembly 60 may be used with other types of energy recovery ventilators or may be also used without the ERV 2. In order to show the interior configuration of the air duct assembly 60 in combination with the exemplary ERV 2 of FIGS. 5-6, the exterior walls of the chamber 70 have been shown as if they are transparent. As shown in FIGS. 5-6, air duct assembly 60 includes an exhaust air duct 62 that is configured to reside within a fresh air intake air duct 68. Also shown in FIG. 6, the air duct assembly 60 includes an insulation layer 78 that encapsulates the fresh air intake air duct 68 and insulates the assembly 60.

Referring to FIG. 5, the exhaust air duct 62 is generally cylindrical in shape and extends from an outdoor air space 61, through exterior wall 64, and terminates into a duct fan 66. Also, fresh air intake air duct 68 extends from the outdoor air space 61, through exterior wall 64, to a duct fan 76 within an air circulation chamber 70. The fresh air intake air duct 68, in one embodiment, is coupled to a filter element 80 in order to filter out any dust, debris, pollutants, or the like from an outside air stream 8. The exhaust air duct 62 resides within a longitudinal cavity of the fresh air intake air duct 68 and is separated from the air stream that flows through the longitudinal cavity of fresh air intake air duct 68. Further, the longitudinal cavity of the fresh air intake air duct 68 extends from the outdoor air space 61 to the interior cavity 74, thereby forming a continuous opening from the outdoor air space 61 to the cavity 74. Also, a concentric duct connection 72 couples the duct assembly 60 to each of the ducts 62, 68 and prevents air leakage from the interior cavity 74 to the air space outside the ERV 2. In operation, the air duct fan 76 draws an outside air stream 8 from, in an example, the outdoor air space 61 through the longitudinal cavity of fresh air intake air duct 68 and into the ERV 2 while stale conditioned air 12 from an interior conditioned air space 50 (shown in FIG. 3) is forced out by fan 66 and exhausted as an exhaust air stream 12 through exhaust air duct 62.

Figure 7:
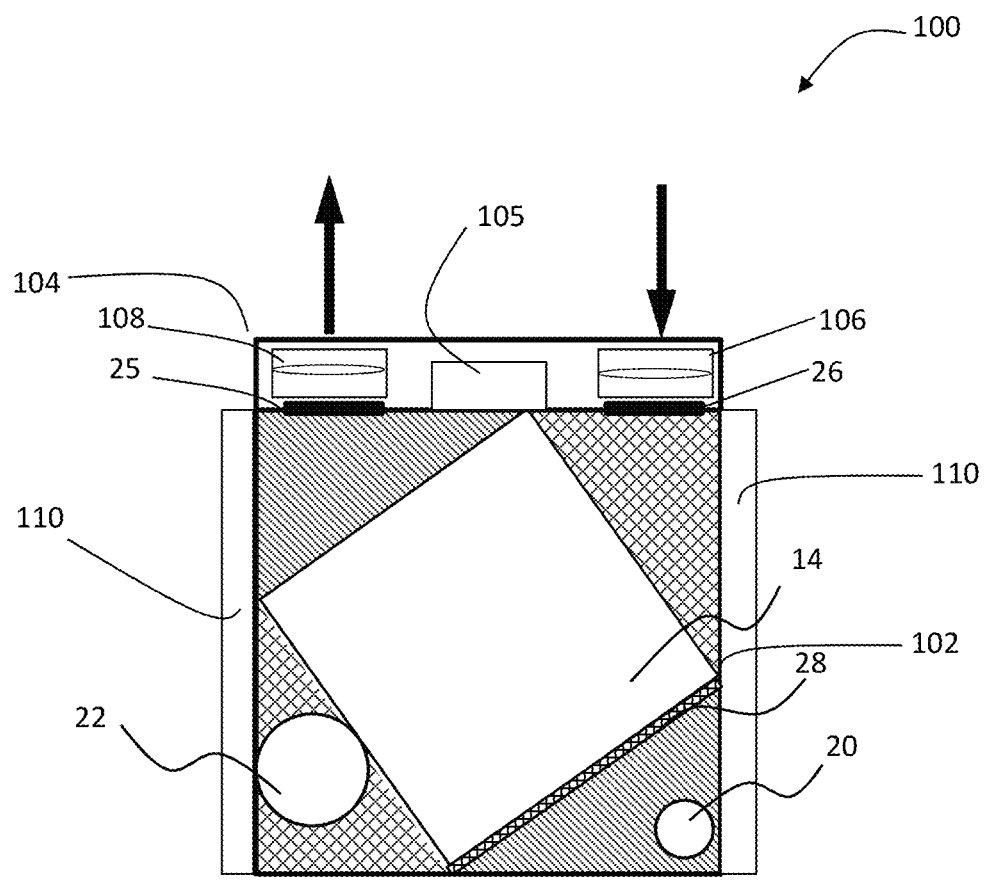
FIG. 7 illustrates a modular energy recovery ventilator in an exemplary embodiment.

FIG. 7 depicts an ERV 100 having modular components to facilitate installation, service and maintenance of the ERV 100. ERV 100 includes an insulated frame module 102.

Frame module 102 contains the heat exchange device 14, filter 28, fresh air supply and stale air exhaust openings with attendant seals. An insulated access door 110 may be mounted to either the front or back of the frame module 102. Heat exchange device 14 may be slidably mounted to frame module 102. In this manner, the heat exchange device 14 can be drawn out through access door 110 to allow for cleaning/service of the heat exchange device 14.

A fan module 104 is removably mounted on top of frame module 102 by mechanical devices such as clamps, clips, etc. Fan module 104 includes a fan 106 for drawing outside air into the ERV 100. Fan module 104 also includes damper 26 to control flow of outside air into the ERV 100. Fan module 104 includes a fan 108 for expelling exhaust air out of the ERV 100. Fan module 104 also includes damper 25 to control flow of exhaust air out of the ERV 100. Fan module 104 also includes a controller 105, where an electrical connection from the heating/cooling system is made. Controller 105 controls fans 106, 108 and dampers 25 and 26. Supply port 22 and return port 20 may be positioned on either the left or right side of frame module 102.

ERV 100 has a narrow profile and can easily fit in tight installation spaces while still allowing for convenient filter and maintenance access due to its modular construction. The modular construction provides ease of installation and service. The insulated frame module 102 can easily be reconfigured for supply and return air path openings on the right or left side of the frame module 102. The fan module 104 on top of frame module 102 allows for quick disassembly of the fan module 104 and controller 105 from the front of the ERV 100 after simply unlatching the access door 110. The access door 110 may be formed in two pieces, one section to cover the fan module 104 with controller 105 and another section to cover the frame module 102. To access either the fan module 104 or the frame module 102, only one section of access door 110 needs to be opened. Dampers 25 and 26 can also easily be removed from the fan module 104 if desired. Heat exchanger core 14 may be slid out through access door 110 so the heat exchanger core 14 can be cleaned and serviced.

The technical effects and benefits of embodiments relate to an ERV for use with a heating or cooling system and include a fresh air intake duct and an exhaust air duct. An outside air stream enters the ERV through air intake duct while stale conditioned air from an interior conditioned air space is exhausted through an exhaust air duct. The ERV also includes a heat exchange device for recovering energy from the stale conditioned air. In an embodiment, the ERV may be electrically wired directly, via a two-wire line, to the heating and cooling system in order to energize the ERV. Also, the ERV may be connected to a furnace/fan coil controller of the heating and cooling system in order to control operation of the ERV without utilizing an additional dedicated controller for ERV control and operation.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An energy recovery system, comprising:
   a heating and cooling system including a controller and a furnace or fan coil in fluid communication with each of a return air duct and a supply air duct; and
   an energy recovery ventilator (ERV) including an intake air duct and an exhaust air duct;
   wherein the return air duct is operable to receive return air from a conditioned air space; and
   wherein the controller is configured for controlling the ERV to transfer energy from the return air to an outside air stream;
   wherein the ERV is directly attached to the return air duct, the ERV including a supply port for directing fresh air to the return air duct and a return port for receiving return air from the return duct, the supply port and return port being located on the same side of the ERV and facing the return air duct, the supply port and return port being in direct communication with the return air duct;
   the ERV positioned between the return duct and an air circulation blower compartment of the furnace or fan coil, the ERV directly connected to the return duct;
   wherein the ERV comprises an air duct assembly coupled to each of the intake air duct and the exhaust air duct
   wherein the exhaust air duct is coupled to a longitudinal cavity of the intake air duct.

2. An energy recovery system, comprising:
   a heating and cooling system including a controller and a furnace or fan coil in fluid communication with each of a return air duct and a supply air duct; and
   an energy recovery ventilator (ERV) including an intake air duct and an exhaust air duct;
   wherein the return air duct is operable to receive return air from a conditioned air space; and
   wherein the controller is configured for controlling the ERV to transfer energy from the return air to an outside air stream;
   wherein the ERV is directly attached to the return air duct, the ERV including a supply port for directing fresh air to the return air duct and a return port for receiving return air from the return duct, the supply port and return port being located on the same side of the ERV and facing the return air duct, the supply port and return port being in direct communication with the return air duct;
   the ERV positioned between the return duct and an air circulation blower compartment of the furnace or fan coil, the ERV directly connected to the return duct;
   wherein the ERV comprises a frame module supporting a heat exchange device and a fan module removably mounted to a portion of the frame module, the fan module including a fan for drawing outside air into the ERV and a fan for expelling exhaust air out of the ERV.

3. The energy recovery system of claim 2 wherein the fan module includes a damper to control flow of outside air into the ERV and a damper to control flow of exhaust air out of the ERV.

4. The energy recovery system of claim 2, wherein the frame module is removable from the ERV.

5. The energy recovery system of claim 2, wherein the ERV comprises a door mounted to the frame module.

6. The energy recovery system of claim 5, wherein the heat exchange device is slidably mounted to the frame module, the heat exchange device slidably removable through the door.

7. An energy recovery system, comprising:
a heating and cooling system including a controller and a furnace or fan coil in fluid communication with each of a return air duct and a supply air duct; and
an energy recovery ventilator (ERV) including an intake air duct and an exhaust air duct;
wherein the return air duct is operable to receive return air from a conditioned air space; and
wherein the controller is configured for controlling the ERV to transfer energy from the return air to an outside air stream;
wherein the ERV is directly attached to the return air duct, the ERV including a supply port for directing fresh air to the return air duct and a return port for receiving return air from the return duct, the supply port and return port being located on the same side of the ERV and facing the return air duct, the supply port and return port being in direct communication with the return air duct;
the ERV positioned between the return duct and an air circulation blower compartment of the furnace or fan coil, the ERV directly connected to the return duct;
wherein the ERV is positioned above the air cleaner, the ERV and the air cleaner being positioned between the air circulation blower compartment housing the furnace or fan coil and the return duct.

8. The energy recovery system of claim 7, wherein the system further comprises an air cleaner in fluid communication with the return air duct.

9. The energy recovery system of claim 8, wherein the air cleaner is one of an air purifier or an air filter, the air cleaner being operable to communicate a filtered air stream from the return air duct to the furnace or fan coil, the filtered air stream comprising a filtered air flow from a mixture of the fresh air stream and the return air.

10. The energy recovery system of claim 7, wherein the intake air duct is operable to receive the outside air stream from an outdoor air space.

11. The energy recovery system of claim 7, wherein the exhaust air duct is operable to exhaust the return air from the conditioned air space.

12. The energy recovery system of claim 7, wherein the ERV comprises an air duct assembly coupled to each of the intake air duct and the exhaust air duct.

13. The energy recovery system of claim 7, wherein the furnace or fan coil is operable to receive a fresh air stream from the ERV.

14. The energy recovery system of claim 7, wherein the furnace or fan coil is operable to communicate a conditioned air flow from an air circulation blower compartment to the supply air duct, the conditioned air flow including filtered air from the air cleaner.

* * * * *